(12) United States Patent
Herf et al.

(10) Patent No.: US 9,946,791 B1
(45) Date of Patent: Apr. 17, 2018

(54) MAKING MODIFIED CONTENT AVAILABLE

(75) Inventors: Michael B. Herf, Los Angeles, CA (US); Sigurdur Asgeirsson, Beaconsfield (CA)

(73) Assignee: Google LLC, Mountain View, CA (US)

( * ) Notice: Subject to any disclaimer, the term of this patent is extended or adjusted under 35 U.S.C. 154(b) by 751 days.

(21) Appl. No.: 11/562,373

(22) Filed: Nov. 21, 2006

(51) Int. Cl.
  *G06F 17/30* (2006.01)

(52) U.S. Cl.
  CPC .. *G06F 17/30799* (2013.01); *G06F 17/30247* (2013.01); *G06F 17/30265* (2013.01)

(58) Field of Classification Search
  USPC ............. 707/100, 10, 200, 203, 101, 102, 707/999.001, 999.202, 999.205, 999.005, 707/999.003, 640, 690, 769; 705/26; 709/223, 213, 217; 715/207, 234, 239, 715/242, 255, 213
  See application file for complete search history.

(56) References Cited

U.S. PATENT DOCUMENTS

| | | | | |
|---|---|---|---|---|
| 5,754,851 | A * | 5/1998 | Wissner | |
| 5,873,085 | A * | 2/1999 | Enoki et al. | 707/10 |
| 5,956,453 | A * | 9/1999 | Yaegashi et al. | 386/290 |
| 6,118,444 | A * | 9/2000 | Garmon et al. | 715/723 |
| 6,757,893 | B1 * | 6/2004 | Haikin | G06F 8/71 717/170 |
| 6,917,951 | B2 * | 7/2005 | Orbits et al. | 707/203 |
| 6,952,281 | B1 * | 10/2005 | Irons et al. | 358/1.15 |
| 7,191,405 | B1 * | 3/2007 | Jaramillo | 715/763 |
| 7,356,679 | B1 * | 4/2008 | Le et al. | 713/1 |
| 7,426,717 | B1 * | 9/2008 | Schang et al. | 717/124 |
| 7,617,222 | B2 * | 11/2009 | Coulthard et al. | |
| 8,428,428 | B2 * | 4/2013 | Tanaka et al. | 386/239 |
| 9,165,003 | B1 * | 10/2015 | Tummala | G06F 17/30091 |
| 2002/0052888 | A1 * | 5/2002 | Sellen et al. | 707/500 |
| 2002/0083037 | A1 * | 6/2002 | Lewis et al. | 707/1 |
| 2002/0133491 | A1 * | 9/2002 | Sim | G06F 17/30067 |
| 2003/0018609 | A1 * | 1/2003 | Phillips et al. | 707/1 |

(Continued)

OTHER PUBLICATIONS

Etienne Wenger et al., "Technology for communities," CEFRIO Book Chapter, v 5.2, Jan. 18, 2005, 15 pages.

(Continued)

*Primary Examiner* — Boris Gorney
*Assistant Examiner* — Bao Tran
(74) *Attorney, Agent, or Firm* — Fish & Richardson P.C.

(57) ABSTRACT

A method for making modified content available includes storing an item comprising contents. A modification procedure to be performed on the item to modify the contents is identified. The method includes generating a file identifier to represent the item such that, upon a request to access the item being received, the modification procedure is performed on the item using the file identifier and the modified contents are provided in response to the request. A method for making modified content available includes receiving a request to access a file identifier that represents an item comprising contents. After receiving the request, a modification procedure to modify the contents is performed. The modification procedure is identified using the file identifier. The modified contents are provided in response to the request. A system includes an application program, a repository and a redirector.

20 Claims, 5 Drawing Sheets

(56) References Cited

U.S. PATENT DOCUMENTS

| | | | |
|---|---|---|---|
| 2003/0033319 A1* | 2/2003 | Van Der et al. | 707/102 |
| 2003/0046261 A1* | 3/2003 | Baker | 707/1 |
| 2003/0115218 A1* | 6/2003 | Bobbitt | G06F 17/30233 |
| 2004/0068524 A1* | 4/2004 | Aboulhosn et al. | 707/200 |
| 2004/0133608 A1* | 7/2004 | Saake et al. | 707/200 |
| 2005/0171947 A1* | 8/2005 | Gautestad | 707/5 |
| 2005/0256909 A1* | 11/2005 | Aboulhosn et al. | 707/200 |
| 2005/0278395 A1* | 12/2005 | Sandaire | 707/203 |
| 2006/0053157 A1* | 3/2006 | Pitts | G06F 17/30106 |
| 2006/0184522 A1* | 8/2006 | McFarland et al. | 707/5 |
| 2007/0255727 A1* | 11/2007 | Hirose et al. | 707/100 |
| 2008/0040388 A1* | 2/2008 | Petri et al. | 707/104.1 |
| 2009/0164620 A1* | 6/2009 | Ziegler et al. | 709/223 |
| 2009/0269028 A1* | 10/2009 | Tanaka et al. | 386/94 |

OTHER PUBLICATIONS

Stefan Decker et al., "The Social Semantic Desktop," DERI Technical Report 2004-05-02, DERI—Digital Enterprise Research Institute, May 2004, 7 pages.

"Windows Networking API/Redirector Structures" [online]. Microsoft Corporation Apr. 10, 2004, [retrieved on Oct. 17, 2006]. Retrieved from the Internet: <URL: http://msdn.microsoft.com/library/en-us/wceredir/html/ceconwindowsnetworkingapiredirectorstructures.asp?frame=true>.

"About Cache Manager in Windows Server 2003" [online]. Microsoft Corporation Apr. 29, 2004, [retrieved on Oct. 2, 2006]. Retrieved from the Internet: <URL: http://support.microsoft.com/?kbid=837331>.

"Fuse" [online]. CSWL Inc. Nov. 30, 2005, [retrieved on Nov. 21, 2006]. Retrieved from the Internet: <URL: http://wiki.tel.tk/13853>.

"Notes and Tags" [online]. Yahoo! Company May 11, 2005, [retrieved on Nov. 10, 2006]. Retrieved from the Internet: http://web.archive.org/web/20051105104022/http://www.flickr.com/learn_more_3.gne.

"Create: Enjoy your pictures in fun, creative ways—it's what photography's all about!" [online]. Google, Inc. 2005, [retrieved on Oct. 2, 2006]. Retrieved from the Internet: <URL: http://picasa.google.com/features/features-create.html>.

"Backup: Don't lose your digital memories. Safely back up your photos with Picasa" [online]. Google, Inc. 2005, [retrieved on Oct. 2, 2006]. Retrieved from the Internet: <URL: http://picasa.google.com/features/features-backup.html>.

"Prints & Products: Print beautiful pictures at home with more custom sizes or order prints, gifts and books from your favorite online companies" [online]. Google, Inc. 2005, [retrieved on Oct. 2, 2006]. Retrieved from the Internet: <URL: http://picasa.google.com/features/features-print.html>.

"Share: The hardest part of sharing your pictures is choosing your favorites" [online]. Google, Inc. 2005, [Retrieved on Oct. 2, 2006]. Retrieved from the Internet: <URL: http://picasa.google.com/features/features-share.html>.

"Edit: Turn a gray sky into a picture-perfect day" [online]. Google, Inc. 2005, [Retrieved on Oct. 2, 2006]. Retrieved from the Internet: <URL: http://picasa.google.com/features/features-edit.html>.

"Organize: Picasa instantly locates and organizes all the pictures on your computer" [online], Google, Inc. 2005, [Retrieved on Oct. 2, 2006]. Retrieved from the Internet: <URL: http://picasa.google.com/features/index.html>.

"Translucent Databases" [online]. Infostrada Communications, LLC, Dec. 15, 2003; [retrieved on Nov. 21, 2006]. Retrieved from the Internet: <URL: http://www.linux-mag.com/index.php?option=com_content&task+view&id=1514&Itemi . . . >.

"Doc.sun.com: man pages section 7: Device and Network Interfaces" [online]. Sun Microsystems, Inc., Apr. 10, 2001; [Retrieved on Nov. 21, 2006]. Retrieved from the Internet: <URL: http://docs.sun.com/app/docs/doc/816-0222/6m6nmlt06?a=view>.

"Using WebDAV with IIS" [online]. TechGenix Ltd., Feb. 3, 2005; [retrieved on Nov. 21, 2006]. Retrieved from the Internet: <URL: http://www.windowsnetworking.com/articles_tutorials/WebDAV-IIS.html>.

"Microsoft Windows Vista Build 5231 (Community Technical Preview 2) Review" [online]. Penton Media, Inc. Oct. 18, 2005, [retrieved on Nov. 21, 2006], Retrieved from the Internet: <URL: http://www.winsupersite.com/reviews/winvista_5231.asp>.

"Windows 95/98/ME and large amounts of memory" [online]. Virtualdub.org May 18, 2005, [retrieved on Nov. 21, 2006]. Retrieved from the Internet: <URL: http://www.virtualdub.org/blog/pivot/entry.php?id=37>.

"Network and Communications" [online]. CSWL Inc. 1999, [retrieved on Nov. 21, 2006]. Retrieved from the Internet: <URL: http://www.cswl.com/whitepapers/filter-driver.html>.

* cited by examiner

MAKING MODIFIED CONTENT AVAILABLE

TECHNICAL FIELD

This document relates to retrieving data.

BACKGROUND

Many computer systems place data volumes in one or more data stores. The storage may be intended for short or long periods, but it can happen that one or more portions of information must be extracted from time to time. Extraction can, for example, be required for purposes of indexing, because an indexing application being executed in the system may need the information extracted before the indexing can be performed. Such indexing (and associated extraction) can be performed on the textual contents of the data store(s) and also on metadata that may be included in any of the items.

The content located in the data store can be accessible using one or more application programs, and the program(s) can be configured such that a user can make one or more changes in a stored item. Upon receiving such a user edit, some conventional programs modify the original item content, and thus store a modified version of the item in a single file. Other conventional programs, in contrast, are configured not to modify the original item with the change(s), but rather to store the change(s) separately and then perform an update on the item contents at runtime when access to the item is sought. However, if the unmodified item is accessed using another program or component that is not configured to recognize the separately stored change(s), it is possible that the existence of the change(s) will not be detected.

SUMMARY

In a first general aspect, a computer-implemented method for making modified content available includes storing an item comprising contents. A modification procedure to be performed on the item to modify the contents is identified. The method includes generating a file identifier to represent the item such that, upon a request to access the item being received, the modification procedure is performed on the item using the file identifier and the modified contents are provided in response to the request.

Implementations can include any, all or none of the following features. An edit can be stored separately without editing the item, and identifying the modification procedure can further include determining that the edit to the item has been stored and registering the edit as the modification procedure. The method can further include providing a virtual file system including at least the file identifier. Several modification procedures for the item can be identified and, upon the request being received, the several modification procedures can be performed on the item before the modified contents are provided. The item can include contents selected from the group consisting of: image content, audio content, video content, document content, multi-media content, and combinations thereof.

In a second general aspect, a computer-implemented method for making modified content available includes receiving a request to access a file identifier that represents an item comprising contents. After receiving the request, a modification procedure to modify the contents is performed. The modification procedure is identified using the file identifier. The modified contents are provided in response to the request.

Implementations can include any, all or none of the following features. The item can include contents selected from the group consisting of: image content, audio content, video content, document content, multi-media content, and combinations thereof. The item can be an image file, the contents can be image contents, and the modification procedure can be selected from the group consisting of: an edit of the image contents, a conversion of the image contents, and a resizing of the image contents. The method can further include storing the modified contents after performing the modification procedure. At least another request can be received after the modified contents are stored, and the method can further include responding to the other request using the stored modified contents. The method can further include providing a virtual file system including at least the file identifier. Several modification procedures for the item can be performed on the item before the modified contents are provided.

In a third general aspect, a system for making modified contents available includes a first application program. The system includes a repository containing at least an item. The item includes contents available using the first application program. The system includes a redirector containing a file identifier representing the item. Upon the redirector receiving a request from a second application program to access the file identifier, a modification procedure is performed on the item and the modified contents are provided in response to the request.

Implementations can include any, all or some of the following features. The redirector can include a kernel-mode driver in the system. The kernel-mode driver can terminate in a user-land application program interface available at least to the second application program. The redirector can include a dynamic link library hosting an object that provides the user-land application program interface. The redirector can include a system-account service configured to start and stop the redirector. The redirector can include a server presenting to the second application program a virtual file system that includes at least the file identifier. Several modification procedures can be performed on the item before the modified contents are provided. The item can include contents selected from the group consisting of: image content, audio content, video content, document content, multi-media content, and combinations thereof.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
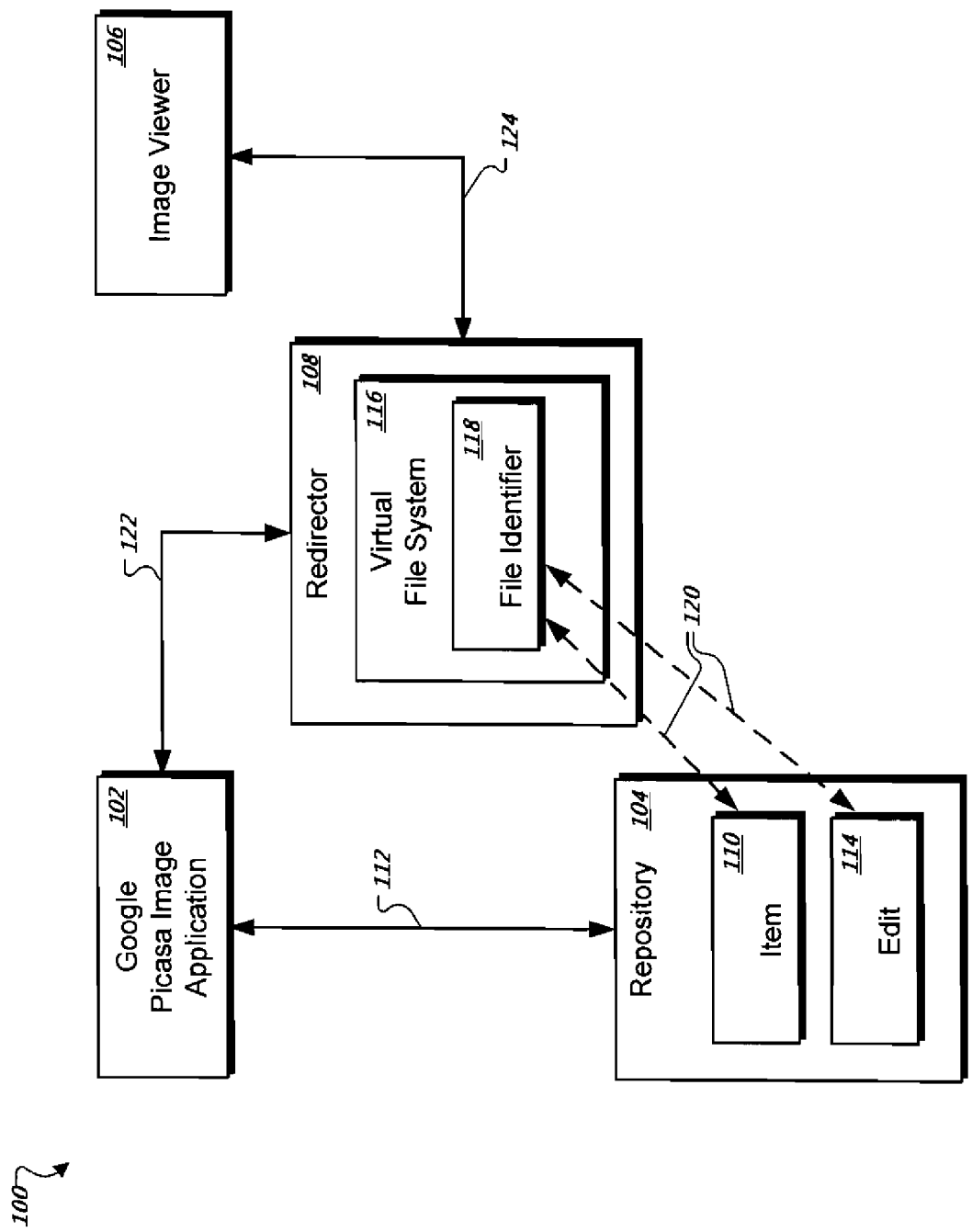
FIG. 1 shows an exemplary system that can present synthesized image content upon request.

FIG. 1 is an exemplary system 100 that can present synthesized image content. In one implementation, the image content is selected from a collection of images, such as photographs, that are sharable electronically within one or more computer systems. The image content can be browsed, viewed and manipulated using one or more of an image application 102, an image repository 104, an image viewer 106, and a redirector 108. For instance, the image content can be stored as an item 110, such as a single photographic image or a virtual photo album logically grouping a collection of photographic images. Though reference is made to managing and manipulating image content, the systems and methods disclosed can be used to manage and manipulate audio, video, documents, multi-media and other forms of content.

The image application 102 within system 100 can be, for example, the Picasa image application available from Google. The image application 102 can be used, for example, to browse, view, sort, catalog, manage and manipulate one or more items 110 within the image repository 104, as indicated by arrow 112.

When changes are made to specific image content, the image application 102 in one implementation does not modify original images, but can instead store the edits separate from the image files. For example, if the image application 102 currently stores the item 110, such as an image forming a digital photograph, the repository 104 containing the item 110 can also include one or more corresponding edits 114. For instance, the edit 114 can represent one or more changes that a user has made to the photograph, such as by using the Picasa application or a third party photo editing application. Examples of such edits can include, for example, image rotation, cropping, captioning, and changes to color, brightness and contrast. Such changes can be stored separately, such as in the edit 114, in order to preserve the original image in the item 110. The image application 102 can, in such an implementation, be configured to synthesize an image when access to the item 110 is sought. That is, the application can apply the change(s) represented by the edit 114 in runtime and present the resulting image to the user.

The image viewer 106 can include one or more applications (e.g., third party applications) that can be used, for example, to browse, view, sort, catalog, manage and manipulate images. The third party applications can include, for example, image viewers, screen savers, and slide show applications. Such applications are, in some implementations, not configured to create the item 110, but can be configured to access and use the item 110. Similarly, in some implementations the image viewer 106 is not configured to access, or recognize in some way, the item's corresponding edit 114. For example, if the image viewer 106 were to directly access the item 110, the corresponding edit 114 may not be captured in the situation that the image viewer 106 were not aware of it. However, the system 100, by using the redirector 108, can provide the image viewer 106 with a synthesized file generated from the item 110 and the edit 114. Providing the synthesized file can render transparent to the image viewer the separate storage of, and subsequent synthesis using, the image edit 114.

The redirector 108 can provide that the image viewer 106 (e.g., a third party application) can access and use modified images. Such modified images can be represented in a file system (e.g., virtual file system) 116 that can be managed by the redirector 108. The file system 116 can include one or more file identifiers 118, each representing a modified image in the repository 104, as indicated by arrows 120. For example, if the file identifier 118 is mapped to an image in the repository 104 that has been modified, such as a user-edited digital photograph stored on a computer, the item 110 can be the unmodified image, and the edit 114 can define the user's edits (e.g., cropping, rotation, etc.). In such an implementation, a synthesized file is generated using the item 110 and the edit 114 can be made available through the file identifier 118.

When the image application 102 stores image content, it can invoke the redirector 108, as indicated by arrow 122. Such image content can be either an unmodified image or edits to an image, to name a few examples. When an unmodified image is stored, the file identifier 118 corresponding to the item 110 can be generated. Similarly, when the image edit 114 is stored, the file identifier 118 can be mapped also to the edits, so that the file identifier corresponds to both the item 110 and the associated edit 114. Either or both of the mappings 120 can be maintained in the repository's file system 116. For example, if the image application 102 stores a digital photograph, the file system 116 can employ the file identifier 118 to access the original photograph stored as the item 110, and to access any changes to the photograph in the edit 114. In a sense, the file identifier 118 can point to and provide access to the current state of the modified image.

The image application 102 can use the redirector 108 to generate the file system 116, making it available to the image viewer 106, among other components. The image viewer 106, in turn, can access the redirector 108, as indicated by arrow 124, to gain access to one or more images represented in the redirector's file system 116. Having access to the file system 116 can allow the image viewer 106 to use file identifiers 118 to access modified content stored in the repository 104. Such file identifiers 118 can accumulate over time, for example, as the image application 102 uses the redirector 108 to store images, including any changes defined in the edits 114. In one implementation where the image viewer 106 is not configured to read the edit file 114 directly, the image viewer 106 can use the resources of the redirector 108, such as file identifiers 118, to gain access to the images, as well as modifications defined by the edits 114.

Using the redirector 108, the image viewer 106 can, in one implementation, initiate composition or synthesis of modified images on the fly. This synthesis can, in one implementation, be accomplished by the image application 102. For example, the redirector 108 can, upon request, prompt the image application 102 to generate a modified image using the item 110 and the edits 114. This modified image can then be provided in response to the request. There can be more than one edit 114 associated with a particular item 110. For example, in some implementations, a separate edit 114 can be stored each time a manipulation is performed on an item 110. In such case, the sum total of all editing can result in a set of edits 114, each mapped to the unmodified image of item 110.

In one implementation, the redirector 108 can be used to provide the image viewer 106 with variations of images, such as black and white versions of color photographs, or can reduce or resize the file to a common pixel size (e.g., 640 pixels). Such variations can be composed on the fly using the redirector 108. In one implementation, the variations can be composed by the image application 102 or by another image processing application (not shown).

In some implementations, the redirector 108 can also present a file system that can, for example, graphically (or otherwise) display shortcuts to original files and/or various modified versions of the original files. Users employing the image viewer 106 can use such a file system to display, for example, one or more named icons within a hierarchical folder system, where each icon can identify the image and any edits performed on the image. The redirector 108 can generate this type of file system from information stored in the file identifiers 118 of its file system 116. In such a way, the modified images can be composed on the fly as they are needed by other applications that form the image viewer 106. In one implementation, the modified images can be composed by the image application 102 or by another image processing application (not shown).

In other implementations, the redirector 108 can perform additional processing on images. For example, image processing can be done when the images are in a format that the image viewer 106 is not configured to process, or not configured to process efficiently. For example, the redirector 108 can be used to facilitate conversion of hard-to-read images (e.g., raw files) into jpegs or another suitable format, or to perform image compression or image resizing. Such conversions can occur on the fly at read time, such as by using the Google Picasa image application 102, and may occur automatically within the semantics, such as by using the same procedures by which the image viewer 106 invokes the redirector 108.

Other modifications can be performed depending on the type of content in the item. For example, modification of an audio file can include compression or re-compression. As another example, video content can be edited, analogously to the image editing described in the examples herein. Electronic documents can be edited as to their content or formatting or both, to name another example.

Figure 2:
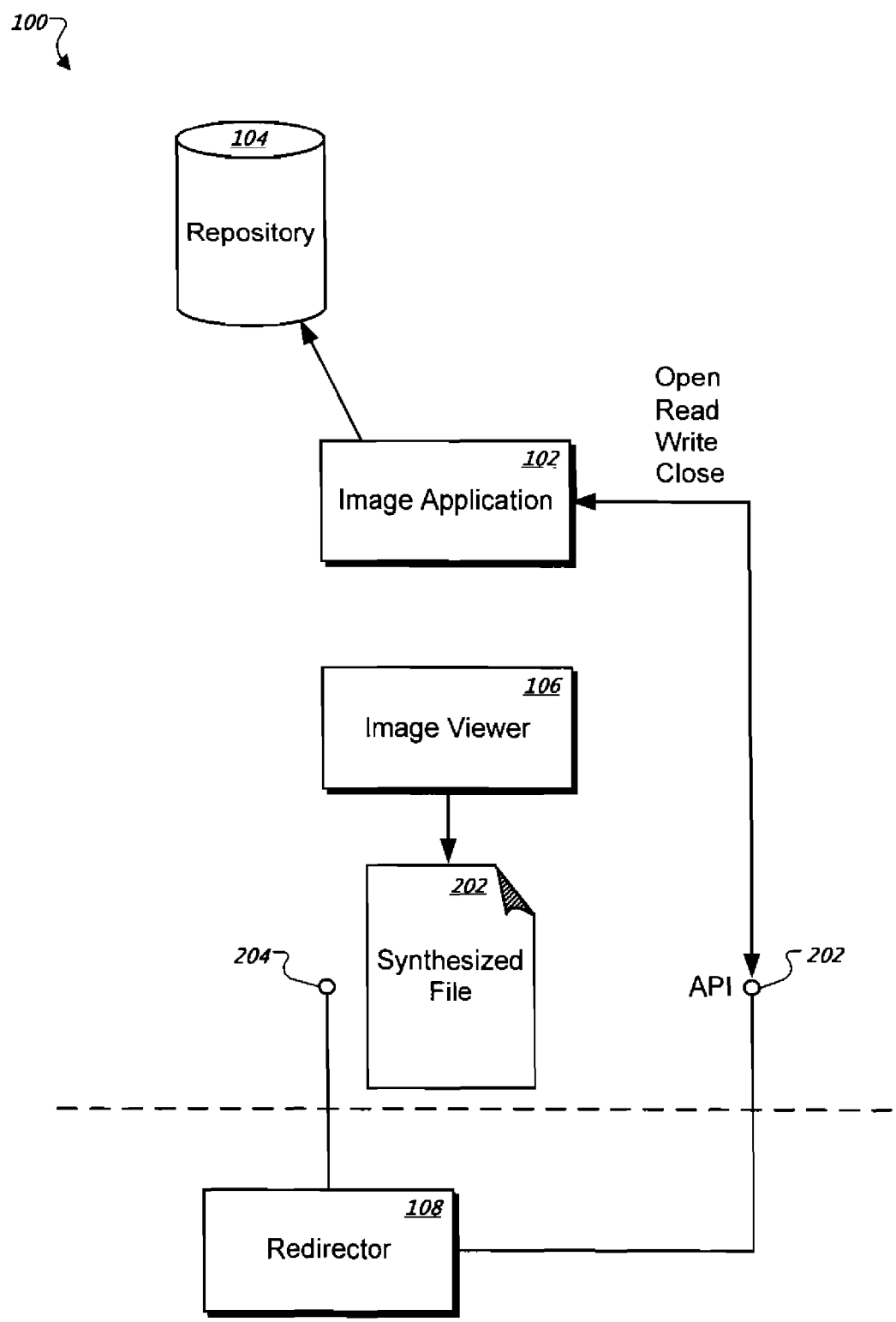
FIG. 2 shows another example of the FIG. 1 system.

FIG. 2 is another depiction of the exemplary system 100 which can browse, view and manipulate image content for one or more purposes and, in particular, can present synthesized image content upon request. As compared to FIG. 1, which depicts the system 100 at a higher, conceptual level, FIG. 2 illustrates the distribution of responsibility between kernel-mode components and user-land components in this example. In particular, FIG. 2 depicts the use of the API of the redirector 108. The description that follows identifies the exemplary interactions that can occur when, for example, the image application 102 stores modified image content, and the image viewer 106 later accesses the modified image content.

When the image application 102 stores image content in the repository 104, the image application 102 can also create a unique name for the image content in the namespace of the redirector 108. Creating the unique name can be accomplished by invoking the redirector 108, using an API 202 of the redirector 108, and forwarding to the redirector 108 the name of the repository 104 and the unique name(s) for the image content. For example, the image content can be represented by the original image stored in the item 110 and the edit(s) stored in the edit 114.

When the redirector 108 receives image content via its API 202, the redirector 108 can store the unique names for the files, for example, in the file system 116 (FIG. 1). Having the image content represented in the redirector's file system 116 can provide the image viewer 106, or other image processing systems, access (e.g., virtual access) to the repository 104. Such virtual access can include access to the item 110 and the edit(s) 114 that represent the modified content. However, the image viewer 106 in some implementations is not able to read the edit(s) 114, and the access to the image content that the redirector 108 provides can then be in the form of a synthesized file 202. Such a file 202 can represent modified image content, for example generated by logically combining the item 110 with the one or more edits 114 to create a composite image that the image viewer 106 can readily use. In another implementation, the synthesized file 202 can be generated by applying another modification procedure to the original image, for example a conversion routine.

When the image viewer 106 requests image content, the image viewer 106 can invoke the redirector 108, using the redirector's API 202. The selection of the specific image content to be viewed within the image viewer 106 can be facilitated using the redirector's file system 116. For example, the file system 116 can present the user of the image viewer 106 with an interface that can graphically display and identify available image content. For instance, when the user selects particular image content to be viewed, the redirector 108 can use the file identifier 118 corresponding to the item 110 and the edit 114 to access the image content. Using such information to access the content, the redirector 108 can generate the synthesized file 202, via its API 204, which the image viewer 106 can use to display the modified content.

If subsequent modifications to an image occur, the modifications can be stored (e.g., as updates) in the repository 104. For example, if the user of the image application 102 edits image content, such as by cropping a digital photograph stored in the item 110, the user modifications can be incorporated into the corresponding edit 114. Alternatively, a new edit 114 can be created for the subsequent edits which can also be mapped to the item 110. In some situations, where the redirector 108 already has stored a representation of the image content in the redirector's file system 116, the file identifier 118 can already have been mapped to the item 110. In another example, the image application 102 can provide the image content to the redirector 108 as described above. In either case, the redirector's file system 116 can include a mapping to the current modified image content, via the file identifier 118 that maps to the item 110 and the edit(s) 114. The image viewer 106 can subsequently request access to the modified image content, using the redirector's API 202. In response, the redirector 108 can cause the synthesized file 202 to be created, via its API 204, and provide the modified content to the image viewer 106.

Figure 3:
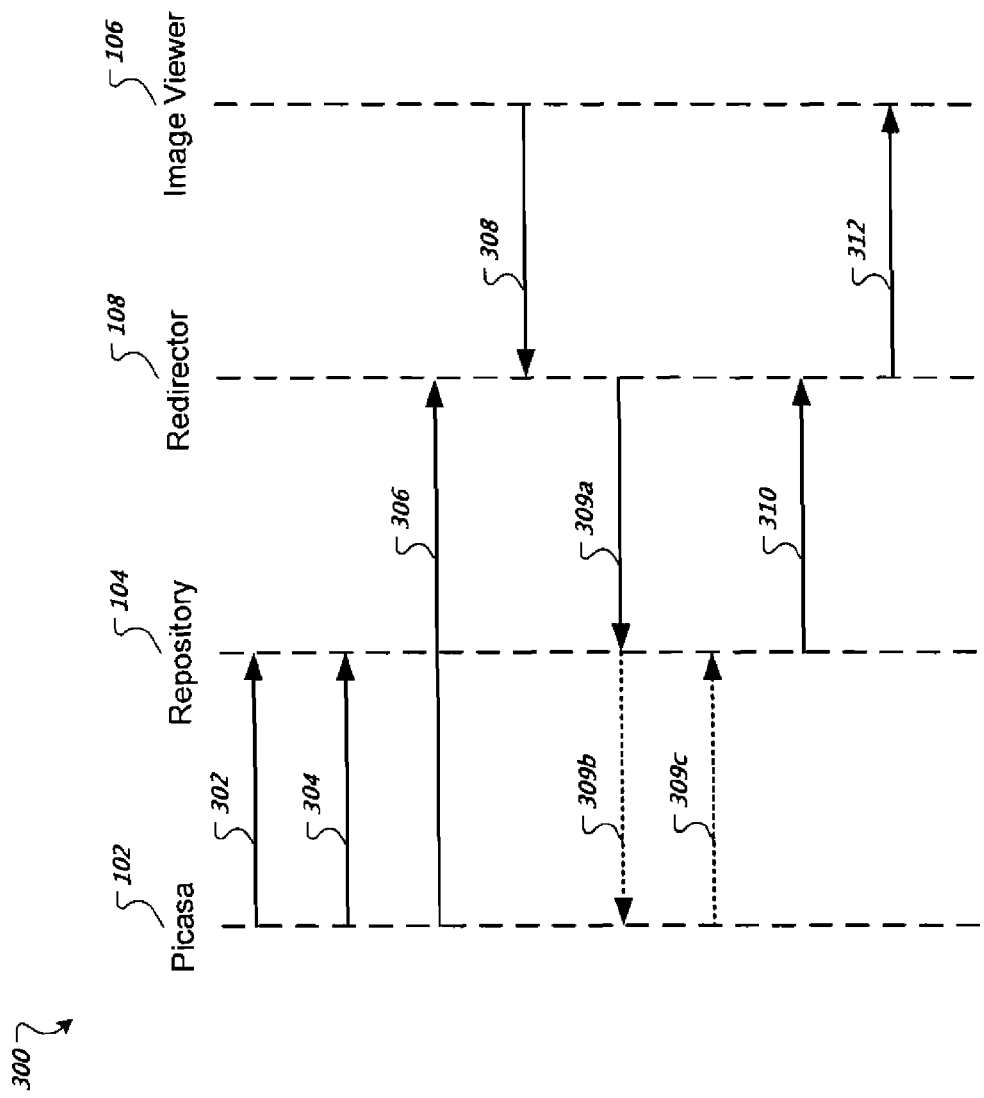
FIG. 3 is a flow diagram of exemplary operations for making modified content available.

FIG. 3 is a flow diagram of exemplary operations for making modified content available, such as modified images within the system 100. Processing can begin in step 302 when an item that contains content is stored. For instance, the image application 102 (e.g., the Google Picasa image application) can store an item 110, such as a digital photograph, in a repository 104. Such a photograph may be, for example, one of several digital photographs that the user is managing within the image application 102.

In step 304, a modification procedure for the item stored in step 302 is identified. For example, image application 102 can provide the modification procedure, in the form of the edit 114, and store the edit 114 in the repository 104. The modification procedure can identify user edits to the digital photograph stored in the item 110. These edits can include, for example, image rotation, cropping, captioning, and changes to color, brightness and contrast. As another example, a resizing, color transforming or converting procedure can be identified as the modification procedure.

In step 306, a file identifier that represents the item and the modification procedure is generated. For instance, the image application 102 can invoke the redirector 108, identifying the item 110 and the edit 114. In other implementations, the redirector 108 is not advised of the file identifier's existence before an application makes a request to use it. A corresponding unique file identifier 118 can then be generated that maps to the item 110 and the edit 114($s$) in the repository 104. In some implementations, the step 306 is performed in the domain of the image application 102 or the repository 104; e.g., the file identifier 118 can be a unique name or path in the redirector's namespace. For example, to represent the user-edited digital photograph originally stored by the image application 102, the file identifier 118 that maps to the original unmodified photograph stored in the item 110 and the modification procedure (e.g., user edits) stored in the edit 114 can be generated. Such a mapping of the file identifier 118 to both the item 110 and the edit(s) 114 can represent the modified content, for example, of the digital photograph.

In step 308, access to the file identifier generated in step 306 is requested. For example, a user employing third party software that forms the image viewer 106 may decide to view a certain modified image. The user may select the modified image, for example, using a graphical display provided by the file system 116. In turn, the image viewer 106 can request the redirector 108 for the file identifier 118 corresponding to the modified image selected by the user.

Next, a notification regarding the request for access is generated. For example, the redirector 108 can notify the repository 104 in step 309a, or the image application 102 in step 309b. Such a notification can be made by the redirector 108 directly, or the request may be forwarded by the repository 104. If optional step 309b is used, the image application 102 can, in optional step 309c, cause the image synthesis to be performed in the repository 104.

In step 310, the requested information is obtained. This can involve a file that has been synthesized from an original image and a modification, such as a defined edit or an image processing operation, for example. For example, upon receipt of a request from the image viewer 106 for a user-specified modified digital photograph, the image application 102 can use the corresponding file identifier 118 to access the item 110 and the associated edit(s) 114 in the repository 104. The image application 102 can further apply the modifications, such as those defined by the edit(s) 114, to the item 110. The image application 102 can compose (or reconstruct) the modified image on the fly, using the original image and any subsequent changes to it.

In step 312, the modified contents are provided to the second application. For example, in response to the request received in step 310, the redirector 108 can provide the modified image, such as the user-specified modified digital photograph file, to the image viewer 106.

Figure 4:
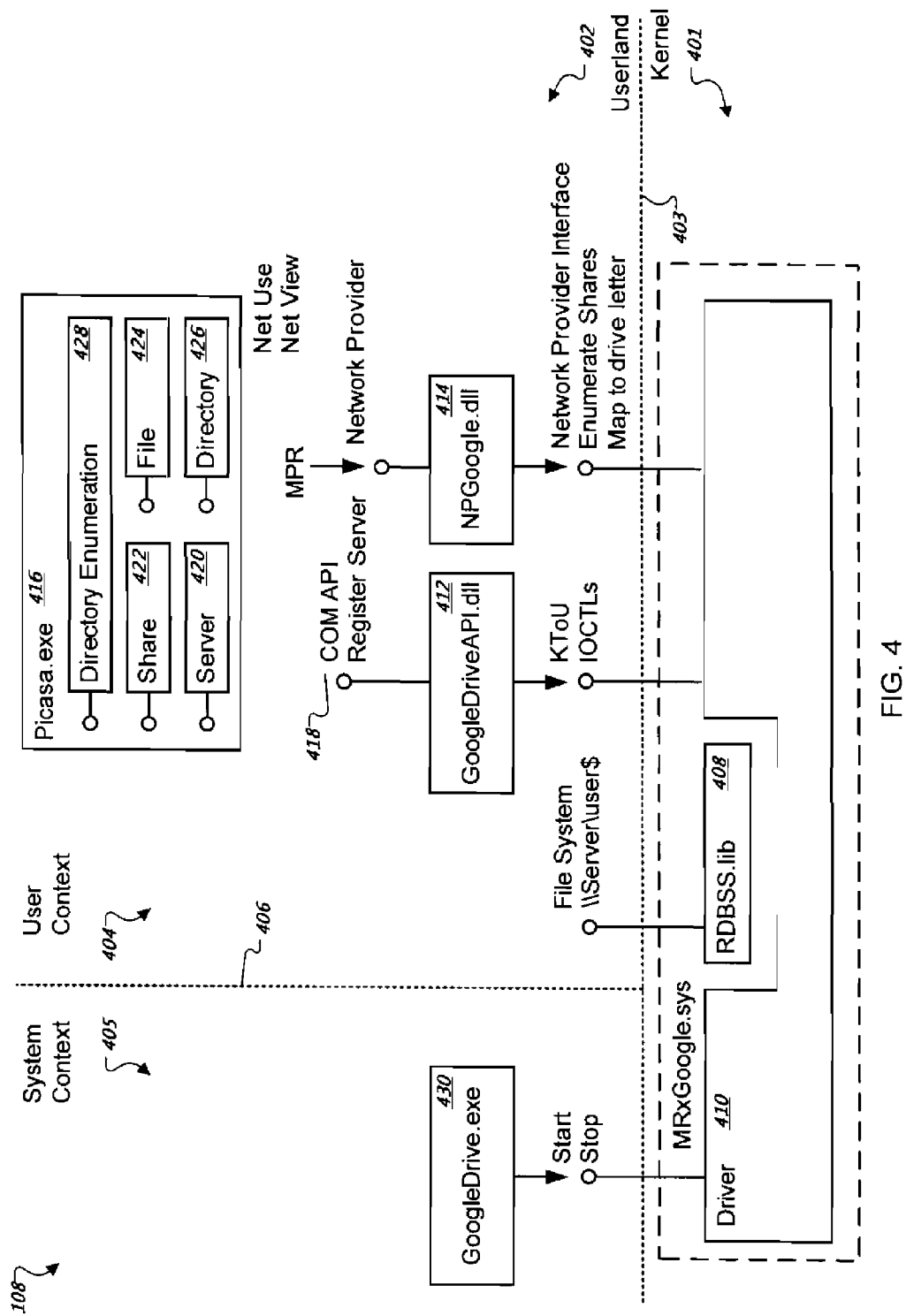
FIG. 4 is a flow diagram of exemplary operations for presenting synthesized image content.

FIG. 4 is a schematic diagram depicting an exemplary implementation of the redirector 108 and associated components. In particular, FIG. 4 shows more details regarding how the redirector 108 can interact with the image application 102, the image viewer 106 and repository 104 of FIGS. 1-3.

The components can be divided logically into a kernel area 401 and a user-land area 402, as indicated by dotted line 403. For example, the types of redirector 108 components in the kernel area 401 can include processes that execute in the kernel area of operating system for purposes of efficiency. The remaining components of the redirector 108 can function in the user-land area 402. These components can include components that execute outside of the kernel, optionally in connection with system programs and third party applications. In some implementations, a given component can have one or more sub-components that execute in the kernel area 401, while other sub-components execute in the user-land area 402.

The user-land area 402 can further be divided logically into a user context area 404 and system context area 405, as indicated by dotted line 406. The types of components present in the user context area 404 can include third party applications, such as applications for storing, managing and viewing images. The types of redirector 108 components present in the system context area 405 can include system-level programs, such as those that start and stop processes within the system.

The portion of the redirector 108 in the kernel area 401 is here a kernel-mode application that is labeled MRxGoogle.sys. The area 401 can include a Redirected Drive Buffering SubSystem (RDBSS) library 408 embedded in a kernel driver 410. The RDBSS.lib 408 can serve as a kernel-level shell for the redirector. The RDBSS.lib 408 can serve as a kernel-level driver that provides services to sub-components in the kernel. The kernel driver 410 can manage integration of kernel interfaces, such as interfaces with the memory manager, cache manager, and input/output manager. The kernel driver 410 can also manage most handle-level semantics, such as per-file read/write calls and pointers, byte-range locking, and permissions, to name a few examples.

The user context area 404 of the redirector 108 includes a GoogleDriveAPI.dll 412, an NPGoogle.dll 414, and a Picasa.exe 416. The GoogleDriveAPI.dll 412 can be, for example, a DLL (dynamic link library) hosting a COM (communication) object that provides the API for handling server registration requests received from the user context area 404, as well as for forwarding requests such as share enumeration, file open/create, read/write, directory enumeration, etc., to the user-land service (e.g., Picasa.exe). The NPGoogle.dll 414 can provide a network provider data link library for services such as enumeration over the redirector's namespace, drive mapping, drive mappings enumeration, and such. Each of the user context area 404 components 412-416 can provide access to resources in the kernel area 401, such as those resources used by the system 100 in image storing, managing and viewing operations as depicted in FIGS. 1-3. The kernel-mode driver 410 can terminate in the user context area 404 where the API of the driver 410 is accessible to the GoogleDriveAPI.dll 412 and the NPGoogle.dll 414, which are in turn accessible to the image application 102.

The Picasa.exe 416 can be a component of the user-land area 402 that registers a server object, such as one that implements IGoogleDriveServer, with the redirector COM API 418. During the registration, the redirector 108 can be associated with a server name in some namespace (e.g., \\desktop in a UNC namespace). File system operations on the namespace governed by the redirector 108 can subsequently result in calls to the server object and objects in the Picasa.exe 416. For example, the Picasa.exe 416 can contain a hierarchy of objects: a server 420, a share 422, a file 424, a directory 426, and a directory enumeration 428, which represent entities in the virtual file system presented by the redirector and/or handle operations thereon.

As an example, an instance of IGoogleDriveFile represents a file on the virtual file system, and handles operations such as Read/Write/SetAttributes, etc., whereas an instance of IGoogleDriveDirectory represents a directory on the virtual file system, and is responsible for creating an instance of IGoogleDriveDirectoryEnumeration upon request to handle directory enumeration of the virtual directory.

The system context area 405 can include a GoogleDrive.exe system service 430. The service 430 can be configured to start (and stop) the redirector 108 at system startup (and shutdown).

Figure 5:
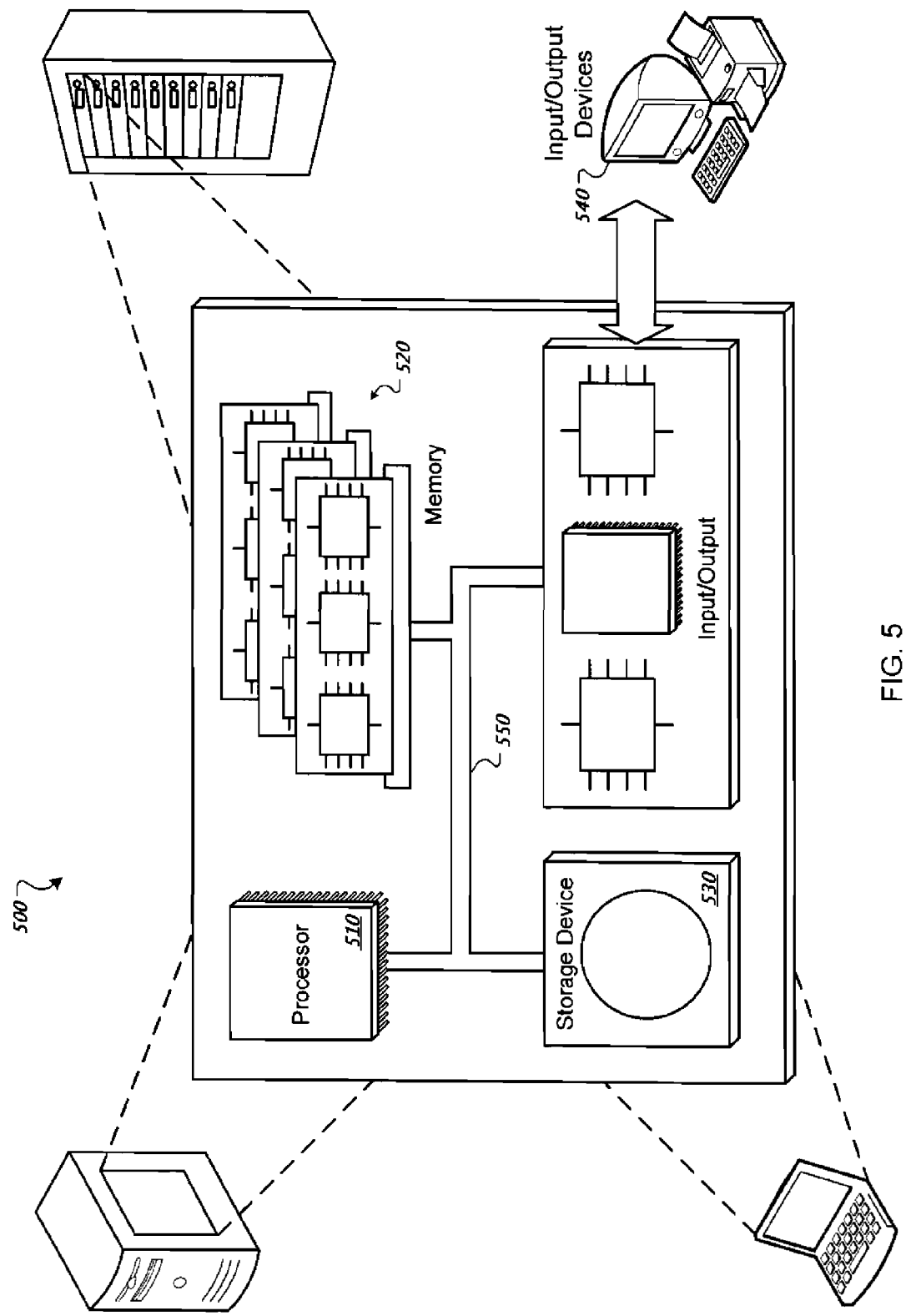
FIG. 5 is a block diagram of a computing system that can be used in connection with computer-implemented methods described in this document.

FIG. 5 is a schematic diagram of a generic computer system 500. The system 500 can be used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them.

The apparatus can be implemented in a computer program product tangibly embodied in a machine-readable storage, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations of the invention have been described. Nevertheless, it will be understood that various modifications may be made without departing from the spirit and scope of the invention. Accordingly, other implementations are within the scope of the following claims.

What is claimed is:

1. A computer-implemented method comprising:
generating, by one or more computers, a virtual file identifier that maps (i) a first file identifier that is associated with unmodified image content to (ii) a second file identifier that is associated with one or more edits to the image content;
receiving, from an image viewing application, a request that indicates the virtual file identifier that maps (i) the first file identifier that is associated with the unmodified image content to (ii) the second file identifier that is associated with one or more edits to the image content; and
in response to receiving the request that indicates the virtual file identifier that maps (i) the first file identifier that is associated with the unmodified image content to (ii) the second file identifier that is associated with one or more edits to the image content, transmitting, to an image editing application, a notification to instruct the image editing application to synthesize the unmodified image content associated with the first file identifier, and the one or more edits to the image content that are associated with the second file identifier that the virtual file identifier maps to the first file identifier.

2. The method of claim 1, comprising:
receiving, from the image editing application, the first file identifier that is associated with the unmodified image content;

receiving, from the image editing application, the second file identifier that is associated with the one or more edits to the image content;

after transmitting the notification, receiving, from the image editing application, the synthesized image content; and providing, to the image viewing application, the synthesized image content.

3. The method of claim 2, wherein:

receiving the second file identifier that is associated with the one or more edits to the image content further comprises receiving the second file identifier that is associated with two or more edits to the image content; and wherein transmitting the notification includes transmitting the notification to instruct the image editing application to synthesize the unmodified image content and the two or more edits to the image content.

4. The method of claim 1, wherein at least one edit of the one or more edits is selected from the group consisting of: a visual edit of the image contents, a conversion of the image contents, and a resizing of the image contents.

5. The method of claim 1, comprising storing the synthesized file without editing the unmodified image content.

6. The method of claim 1, further including:

providing a virtual file system including at least the first file identifier, the second file identifier, and the virtual file identifier; and presenting a graphical interface of the virtual file system including icons representing the first file identifier, the second file identifier, and the virtual file identifier, wherein receiving, from the image viewing application, the request that indicates the virtual identifier further includes receiving a selection of the icon representing the virtual file identifier.

7. The method of claim 1, wherein:

the receiving the request and the synthesized content is facilitated by a kernel driver executing within a kernel area, and transmitting the notification is facilitated by a communication object hosted by a dynamic link library executing outside of the kernel area.

8. A non-transitory computer readable medium encoded with a computer program, the program comprising instructions that when executed by one or more computers cause the one or more computers to perform operations comprising:

generating a virtual file identifier that maps (i) a first file identifier that is associated with unmodified image content to (ii) a second file identifier that is associated with one or more edits to the image content;

receiving, from an image viewing application, a request that indicates the virtual file identifier that maps (i) the first file identifier that is associated with the unmodified image content to (ii) the second file identifier that is associated with one or more edits to the image content; and in response to receiving the request that indicates the virtual file identifier that maps (i) the first file identifier that is associated with the unmodified image content to (ii) the second file identifier that is associated with one or more edits to the image content, transmitting, to an image editing application, a notification to instruct the image editing application to synthesize the unmodified image content associated with the first file identifier, and the one or more edits to the image content that are associated with the second file identifier that the virtual file identifier maps to the first file identifier.

9. The medium of claim 8, wherein the operations comprise:

receiving, from the image editing application, the first file identifier that is associated with the unmodified image content;

receiving, from the image editing application, the second file identifier that is associated with the one or more edits to the image content;

after transmitting the notification, receiving, from the image editing application, the synthesized image content; and providing, to the image viewing application, the synthesized image content.

10. The medium of claim 9, wherein:

receiving the second file identifier that is associated with the one or more edits to the image content further comprises receiving the second file identifier that is associated with two or more edits to the image content; and wherein transmitting the notification includes transmitting the notification to instruct the image editing application to synthesize the unmodified image content and the two or more edits to the image content.

11. The medium of claim 8, wherein at least one edit of the one or more edits is selected from the group consisting of: a visual edit of the image contents, a conversion of the image contents, and a resizing of the image contents.

12. The medium of claim 8, wherein the operations comprise storing the synthesized file without editing the unmodified image content.

13. The medium of claim 8, wherein the operations comprise:

providing a virtual file system including at least the first file identifier, the second file identifier, and the virtual file identifier; and presenting a graphical interface of the virtual file system including icons representing the first file identifier, the second file identifier, and the virtual file identifier, wherein receiving, from the image viewing application, the request that indicates the virtual identifier further includes receiving a selection of the icon representing the virtual file identifier.

14. The medium of claim 8, wherein:

the receiving the request and the synthesized content is facilitated by a kernel driver executing within a kernel area, and transmitting the notification is facilitated by a communication object hosted by a dynamic link library executing outside of the kernel area.

15. A system comprising:

one or more computers; and a computer-readable medium coupled to the one or more computers having instructions stored thereon which, when executed by the one or more computers, cause the one or more computers to perform operations comprising:

generating a signal virtual file identifier that maps (i) a first file identifier that is associated with unmodified image content to (ii) a second file identifier that is associated with one or more edits to the image content;

receiving, from an image viewing application, a request that indicates the virtual file identifier that maps (i) the first file identifier that is associated with the unmodified image content to (ii) the second file identifier that is associated with one or more edits to the image content; and in response to receiving the request that indicates the virtual file identifier that maps (i) the first file identifier that is associated with the unmodified image content to (ii) the second file identifier that is associated with one or more edits to the image content, transmitting, to an image editing application, a notification to instruct the image editing application to synthesize the unmodified image content associated with the first file identifier, and the one or more edits to the image content that are associated with the second file identifier that the virtual file identifier maps to the first file identifier.

16. The system of claim 15, wherein the operations comprise:

receiving, from the image editing application, the first file identifier that is associated with the unmodified image content;

receiving, from the image editing application, the second file identifier that is associated with the one or more edits to the image content;

after transmitting the notification, receiving, from the image editing application, the synthesized image content; and providing, to the image viewing application, the synthesized image content.

17. The system of claim 16, wherein:

receiving the second file identifier that is associated with the one or more edits to the image content further comprises receiving the second file identifier that is associated with two or more edits to the image content; and wherein transmitting the notification includes transmitting the notification to instruct the image editing application to synthesize the unmodified image content and the two or more edits to the image content.

18. The system of claim 15, wherein at least one edit of the one or more edits is selected from the group consisting of: a visual edit of the image contents, a conversion of the image contents, and a resizing of the image contents.

19. The system of claim 15, wherein the operations comprise storing the synthesized file without editing the unmodified image content.

20. The system of claim 15, wherein the operations comprise:

providing a virtual file system including at least the first file identifier, the second file identifier, and the virtual file identifier; and presenting a graphical interface of the virtual file system including icons representing the first file identifier, the second file identifier, and the virtual file identifier, wherein receiving, from the image viewing application, the request that indicates the virtual identifier further includes receiving a selection of the icon representing the virtual file identifier.

* * * * *

UNITED STATES PATENT AND TRADEMARK OFFICE
CERTIFICATE OF CORRECTION

| | | |
|---|---|---|
| PATENT NO. | : 9,946,791 B1 | |
| APPLICATION NO. | : 11/562373 | |
| DATED | : April 17, 2018 | |
| INVENTOR(S) | : Herf et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 799 days.

Signed and Sealed this
Sixth Day of December, 2022

Katherine Kelly Vidal
*Director of the United States Patent and Trademark Office*